3,355,321

RECRYSTALLIZATION OF SULPHIDES OF CADMIUM AND ZINC IN THIN FILMS

Aron Vecht, Harlow, England, assignor to Associated Electrical Industries Limited, London, England, a British company No Drawing. Filed May 14, 1964, Ser. No. 367,553
Claims priority, application Great Britain, May 21, 1963, 20,242/63
8 Claims. (Cl. 117—62)

ABSTRACT OF THE DISCLOSURE

A method for the recrystallization of sulphides of zinc or cadmium deposited in thin films on a glass or like support includes the introduction of copper or silver into the films for modifying crystal form and properties, and this is done by immersing the support containing the film in a heated inert organic liquid such as dinonyl phthalate or Silicone Fluid M.S. 704 wherein the copper or silver is added in the form of metal powder or as an organo-metallic compound such as the copper and silver complexes of diethyl dithio carbamate. The method of the invention is carried out while the organic liquid is heated about 350° to 400° C. at which temperature the liquid remains stable. In the method crystal growth may be promoted further by introduction into the liquid of organo halogen compounds such as o- and p-dichlorobenzene.

This invention is concerned with methods for the recrystallization of the sulphides of cadmium and zinc in thin films to obtain a variety of crystalline forms, and is particularly concerned with methods for the introduction of copper and silver into thin crystalline layers of these sulphides in order to improve their properties for certain uses in industry.

Thin layers of the sulphides of cadmium and zinc, normally supported on a substrate of glass, Pyrex or silica, are used as triodes, as photoconductors and as phosphors. Pyrex is a trademark identifying a heat resisting borosilicate glass manufactured by Corning Glass Works, Corning, N.Y. Their properties can be modified to some extent by recrystallization on the substrate while copper or silver is introduced into the layer. This has usually been done by fusing in copper or silver at temperatures ranging from 500° C. to 1300° C. or by reactions at high temperatures in the vapour phase.

For both photoconductor and triode purposes the silver or copper used to promote crystal growth interferes considerably with the electrical properties of the cadmium sulphide. To ensure good results, a further firing stage is required to remove excess copper or silver. In addition adequate control over the amount of copper or silver evaporated may not be possible without elaborate monitoring.

The present invention overcomes these difficulties by providing a method whereby the copper and silver are introduced at lower temperatures than heretofore and the amount of metal added can be accurately known.

Briefly stated, the method of this invention consists in immersing a cadmium sulphide or zinc sulphide layer on a substrate in a heated inert organic liquid to which copper or silver has been added as a metallic powder or an organo-metallic compound, and keeping the layer immersed in the liquid for a sufficient time for the required recrystallization to be accomplished.

The inert liquid medium chosen has ideally to be stable to 350°–400° C. and free from heavy metal impurities For this purpose silicone fluid M.S. 704 and dinony phthalate were found very suitable. Silicone Fluid M.S 704 is a trademark identifying a polysiloxane liquic manufactured by Dow Corning Corporation of Midland Mich. or one of its subsidiaries. Although similar results were obtained with chrysene, this compound solidified on cooling and was awkward to use.

The organo-metallic compounds used were the copper and silver complexes of diethyl dithio carbamate. Diethyl dithio carbamate may be prepared as an ethyl ester of N-ethyl dithio carbamic acid $(C_2H_5)NH.CSSH$ and will have the formula $(C_2H_5)NH.CSSC_2H_5$. This is analogous to the ethyl ester of N-ethyl carbamic acid $$(C_2H_5)NH.COOH$$

which has the formula $(C_2H_5)NH.COOC_2H_5$.

In addition to organo-metallic compound it was found that crystal growth was promoted further by the addition of organo halogen compounds. It is interesting to note that these do not seem to promote crystallization on their own. Typical of such compounds were o- and p-dichlorobenzene.

There are several methods by which the invention can be put into practice, as shown by the following examples, which are given by way of illustration.

*Example I*

Heat crystals or thin films in inert organic liquids to which Cu or Ag metal has been added as metallic powder. By some mechanism not fully understood the Cu induces some crystal growth of thin films and is introduced into the crystal.

| | |
|---|---|
| Volume of inert medium (dinonyl phthalate) ____cc__ | 15 |
| Weight of metal powder ____gram__ | 0.1 |
| Temperature ____° C.__ | 400 |
| Time ____mins__ | 60 |

*Example II*

By using of Ullman type reaction, i.e.

$$Cu+R_2X\rightarrow CuX_2+RR$$

where X is any halide and R is an alkyl or amyl group.

| | |
|---|---|
| Volume of inert medium (dinonyl phthalate) ____cc__ | 15 |
| Weight of metal powder ____gram__ | 0.1 |
| Temperature ____° C.__ | 350 |
| Time ____mins__ | 30 |
| Weight of organo-halide (para dichloro benzene) gram__ | 1 |

*Example III*

Using a small quantity of organo-metallic compound dispersed but preferably dissolved in the inert medium.

| | |
|---|---|
| Volume of organic medium (dinonyl phthalate) ____cc__ | 15 |
| Weight of organo-metallic compound (Cu or Ag diethyl dithio carbamate) ____mgrams__ | 20 |
| Temperature ____° C.__ | 350 |
| Time ____mins__ | 30 |

Quoted conditions are for crystallization of a CdS thin film 1 cm.² and 3.5μ thick. For incorporation quantities vary depending on the material into which Cu or Ag are to be incorporated and actuation required.

*Example IV*

The method is similar to Example III, but an organo-halogen compound is used in addition. A typical preparation was as follows.

The thickness of the layer was 1.6μ.

| | |
|---|---|
| Volume of inert medium (Silicone Fluid 704) ____cc____ | 15 |
| Weight of organo-metallic compound (Ag diethyl dithio carbamate) ____mgrams____ | 20 |
| Weight of organo-halogen compound (paradichlorobenzene) ____grams____ | 5 |
| Temperature ____° C____ | 400 |
| Time ____hour____ | 1 |

By employing the methods of this invention, the incorporation of impurities such as copper or silver into the layer can be used to modify the forms of crystals and therefore their properties, or these impurities can be introduced directly into the completed crystals, with important results.

What I claim is:

1. A method of recrystallizing the sulphides of cadmium and zinc in thin films, which comprises immersing a metal sulphides selected from the group consisting of cadmium and zinc sulphides as a layer on a substrate in an inert organic liquid to which has been added in a finely divided state a metal selected from the group consisting of copper and silver, and keeping the layer immersed in the liquid for a sufficient time for the required recrystallization to be accomplished.

2. A method according to claim 1, in which the metal added to the inert liquid is in the form of an organometallic compound.

3. A method according to claim 2, in which the organometallic compound is the copper complex of diethyl dithio carbamate.

4. A method according to claim 2, in which the organometallic compound is the silver complex of diethyl dithio carbamate.

5. A method according to claim 1, in which the inert organic liquid is a silicone oil.

6. A method according to claim 1, in which the inert organic liquid is dinonyl phthalate.

7. A method according to claim 1, in which recrystallization is promoted by the addition of an organo-halogen compound.

8. A method according to claim 7, in which the organohalogen compound is dichlorobenzene.

References Cited

UNITED STATES PATENTS

| | | | |
|---|---|---|---|
| 2,725,316 | 11/1955 | Fuller | 148—186 |
| 2,762,730 | 9/1956 | Alexander | 148—186 |
| 2,820,841 | 1/1958 | Carlson et al. | 148—186 X |
| 2,835,613 | 5/1958 | Haayman | 148—186 |
| 2,997,408 | 8/1961 | L'Heureux | 117—211 X |
| 3,158,512 | 11/1964 | Nelson et al. | 148—1.5 |
| 3,279,962 | 10/1966 | Grimmeiss et al. | 148—186 |

ALFRED L. LEAVITT, *Primary Examiner.*

J. H. NEWSOME, *Assistant Examiner.*